United States Patent [19]

Yokoyama

[11] Patent Number: 5,802,261

[45] Date of Patent: Sep. 1, 1998

[54] FACSIMILE APPARATUS IMPROVED PRINTER, SCANNER AND COMMUNICATION FUNCTIONS

[75] Inventor: Hiroshi Yokoyama, Atsugi, Japan

[73] Assignee: Ricoh Company, Ltd., Tokyo, Japan

[21] Appl. No.: 741,903

[22] Filed: Oct. 31, 1996

[30] Foreign Application Priority Data

Nov. 14, 1996 [JP] Japan ................. 7-319694

[51] Int. Cl.$^6$ ................. H04N 1/21
[52] U.S. Cl. ................. 395/115; 358/404; 358/437; 358/442
[58] Field of Search ................. 358/404, 434, 358/444, 442, 468, 437; 395/113–115; 379/100.02, 100.05, 100.06; H04N 1/21, 1/82, 1/333

[56] References Cited

U.S. PATENT DOCUMENTS

| | | |
|---|---|---|
| 4,905,098 | 2/1990 | Sakata . |
| 5,311,327 | 5/1994 | Fukushima et al. ................. 358/404 |
| 5,377,016 | 12/1994 | Kashiwagi et al. . |
| 5,428,548 | 6/1995 | Aiba et al. ................. 358/468 |
| 5,459,579 | 10/1995 | Hu et al. ................. 358/434 |
| 5,621,540 | 4/1997 | Terajima ................. 358/404 |
| 5,634,090 | 5/1997 | Narukama et al. ................. 395/114 |

*Primary Examiner*—Kim Yen Vu
*Attorney, Agent, or Firm*—Oblon, Spivak, McClelland, Maier & Neustadt, P.C.

[57] ABSTRACT

A facsimile apparatus having a printer function for local or remote printing out of image data from a computer, and a scanner device which reads an original document and produces corresponding image data for transmission and remote printing. A printer control device controls a connection with the computer to receive image data from the computer. Image device from the printer control device is processed using the same processing mechanisms as image data from the scanner device, and applied to a communication device capable of sending the image data in the form of facsimile data to a destination facsimile apparatus. The processing mechanisms include a memory which stores the image data from either the scanner device or the printer control device, and outputs the stored image data to the communication device for transmission as the facsimile data.

2 Claims, 8 Drawing Sheets

FACSIMILE APPARATUS IMPROVED PRINTER, SCANNER AND COMMUNICATION FUNCTIONS

BACKGROUND THE INVENTION

1. Field of the Invention

The present invention relates to a facsimile apparatus and, more particularly, to a facsimile apparatus including a printer function for printing out image data from a computer.

2. Discussion of Background

Figure 9A:
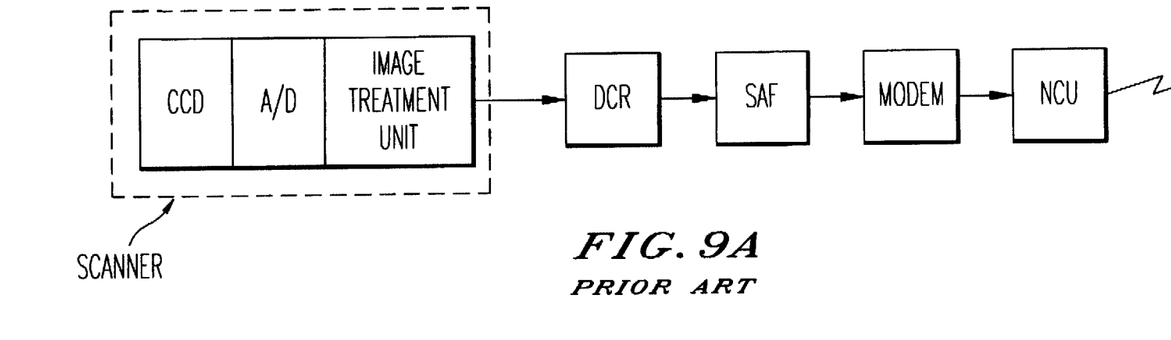
FIGS. 9A and 9B are schematic illustration of image data flow from a scanner and from a personal computer as occurs with a conventional facsimile apparatus.
Figure 9B:
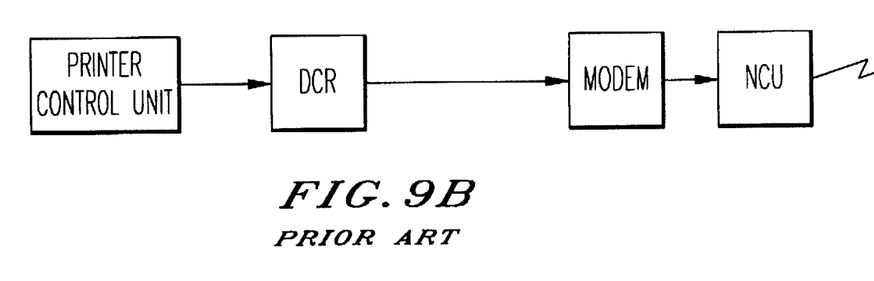

FIGS. 9A and 9B are schematic block diagrams which explain a conventional facsimile apparatus including a printer function for printing out image data from a computer. While FIGS. 9A and 9B conceptually show image data flow from a scanner and from a printer control unit, in reality each device shown is connected to a bus.

FIG. 9A illustrates facsimile function in which image data read by a CCD (charged coupled device) is transmitted to an A/D (analog/digital) conversion device, and then to an image treatment device which judges whether the image data is a white data or a black data based on a predetermined algorithm, a DCR (coder/decoder) unit, a SAF (store and forward) memory, and an NCU (network control unit) which sends the image data to a predetermined facsimile apparatus through a data communication line.

On the other hand, FIG. 9B illustrates a facsimile function for a personal computer, in which image data from a printer control device is transmitted to the DCR, the MODEM and, the NCU and sent to a predetermined destination facsimile apparatus through the data communication line.

As is evident, the flow of image data from a scanner is different from that of a printer controller, so that in an existing facsimile apparatus a program is needed for managing flow of image data in order to establish a printer function. As a result, it is necessary to design and/or manufacture the facsimile apparatus with and without a printer function, resulting in increased overhead and an increase in cost of the facsimile apparatus.

SUMMARY OF THE INVENTION

It is therefore an object of the present invention to provide a facsimile apparatus in which the flow of image data is the same regardless of whether the image data is generated by a scanner or by a print control unit.

To that end, there is provided in accordance with the present invention, a novel facsimile apparatus including a printer function for printing image-data output from a computer, including a scanner device which reads image data from an original document, a printer control device which controls a connection to the computer, a communication device which sends the image data to a destination facsimile apparatus, and a memory which stores the image data from the scanner device and from the printer control device and transmits the stored image data to the communication device for transmission as facsimile data.

Further, in accordance with the present invention, there is provided a buffer memory which stores the image data from the scanner device and the printer control device and transmits the stored image data to the memory.

Furthermore, in accordance with the present invention, there is provided a signal generation device which generates a signal indicating whether or not transmitting image data from the printer control unit is allowed.

Still further, in accordance with the present invention, the signal generation device includes a control device which outputs a control signal to the printer control unit based on a condition of the buffer memory.

Upon determining that the buffer memory is full, the control device stops outputting the control signal to the signal generation device.

BRIEF DESCRIPTION OF THE DRAWINGS

The above and other objects, features and advantage of the present invention will become more apparent from the following detailed description taken with the accompanying drawings in which:

FIG. 5 (a) and (b) are schematic illustrations of flow of image data from a scanner and from a personal computer according to a second embodiment of the facsimile apparatus of the present invention;

DESCRIPTION OF THE PREFERRED EMBODIMENTS

Figure 1:
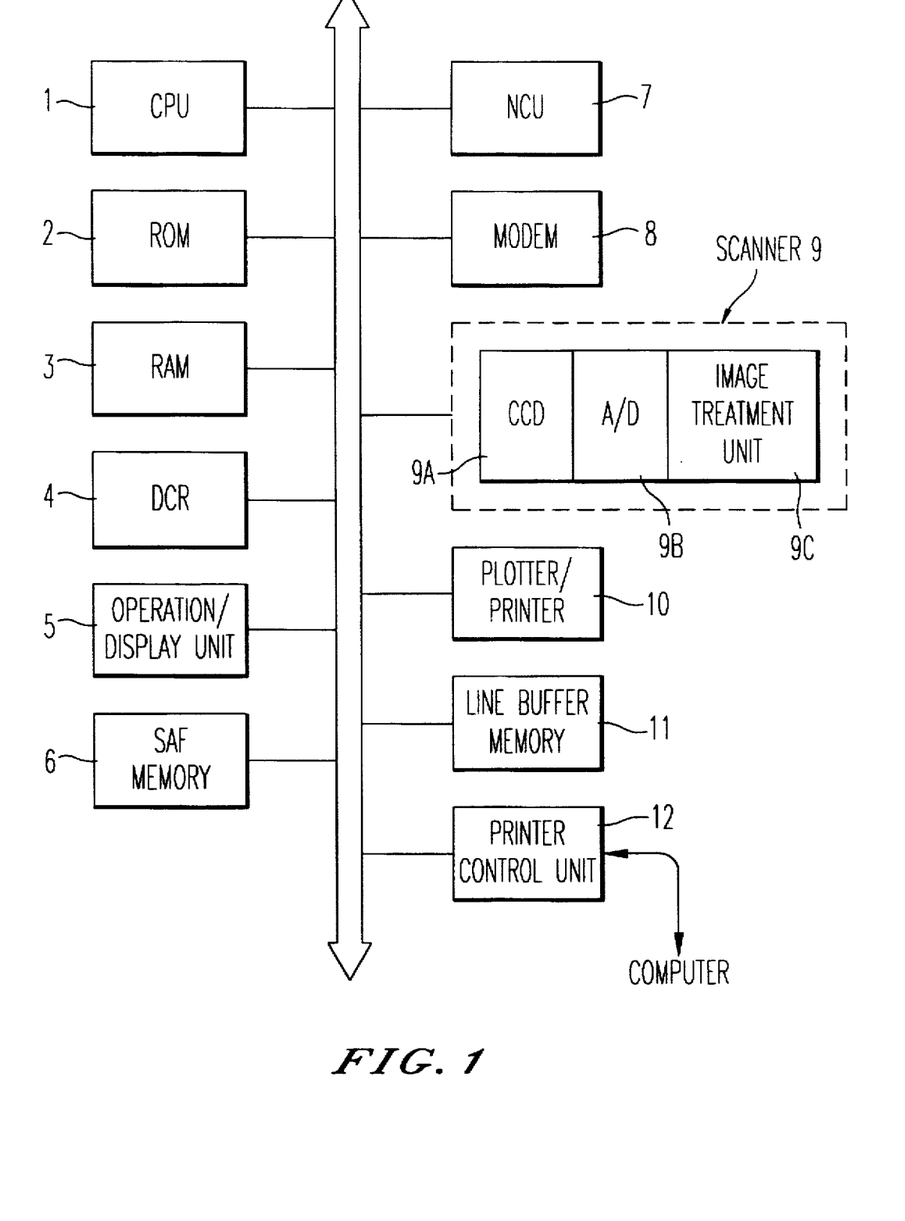
FIG. 1 is a schematic block diagram showing an embodiment of the facsimile apparatus in accordance with the present invention.

Referring now to the drawings where like reference numerals correspond to the same or similar elements throughout the several views, and more particularly to FIG. 1 thereof, the basic construction of a facsimile apparatus in accordance with the present invention is shown.

As shown, the facsimile apparatus includes a CPU (central processor unit) 1, a ROM (read only memory) 2, a RAM (random access memory) 3, a DCR (data compression and recompression) unit 4, an operation/display unit 5, a SAF (store and forward) memory 6, a NCU (network control unit) 7, a MODEM (modulation/demodulation) 8, a scanner unit 9, a plotter unit 10, a line buffer memory 11, and a printer control unit 12, all of which are coupled to each other by system bus 19.

The CPU 1 controls and manages all of the units in the facsimile apparatus based on a system program stored in ROM 3.

The RAM 2 temporarily stores compressed image data received through the telephone line and recompressed image data from the DCR unit 4.

The ROM 3 stores the system program and some parameter data for setting conditions of the facsimile apparatus.

The DCR unit 4 compresses original image data in accordance with a predetermined algorithm and recompresses compressed image data received through the telephone line into original image data.

The operation/display unit 5 is provided with a keyboard board to be operated by users and with a display panel for various messages and other information.

The SAF memory 6 temporarily stores compressed image data.

The NCU 7 controls communication with a network through a telephone line.

The MODEM 8 modulates facsimile data to be transmitted or demodulates received facsimile data.

The scanner unit 9 includes a CCD 9A, an A/D conversion devise 9B, and an image treatment unit 9C. Scanner unit 9 reads image data at a predetermined resolution from the original document.

The plotter unit 10 records recompressed image data on a sheet.

The line buffer memory 11 stores image data line by line.

The printer control unit 12 controls connection with a personal computer.

When interfacing with the computer, the facsimile apparatus has a local print mode for recording image data from the personal computer and a remote print mode for sending image data from the personal computer.

Figure 2:
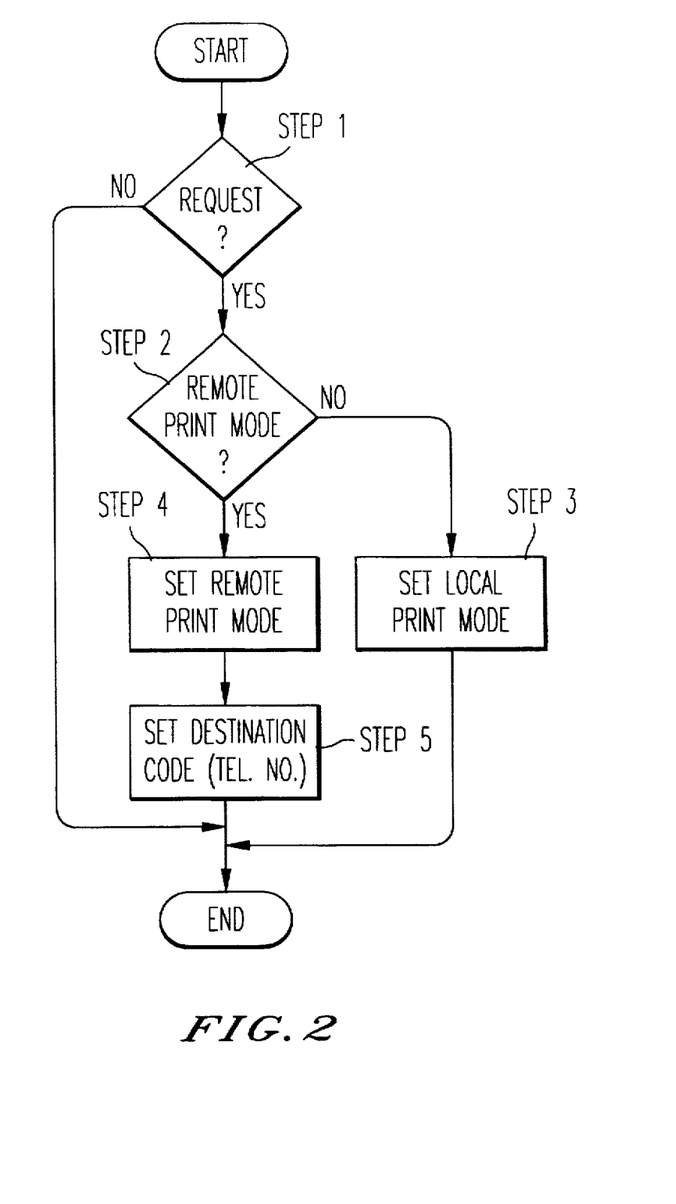
FIG. 2 is a flow chart illustrating steps of a mode set up for outputting an image data from the computer.

FIG. 2 is a flow chart showing steps for setting a local print mode and a remote print mode.

First, in step 1 if a request for setting print modes has been made by the operation/display unit 5, the CPU 1 judges whether or not the request indicates setting up the remote print mode for printing of image data at a remote facsimile apparatus in step 2. When the CPU 1 determines that the request is not for setting the remote print mode, the CPU 1 sets the local print mode for printing by a local printer, the plotter/printer 10 shown in FIG. 1, in step 3. On the other hand, when the request indicates setting of the remote print mode, the CPU 1 sets the remote print mode in STEP 4 and stores an entered destination code in the RAM 2 in STEP 5.

Figure 3:
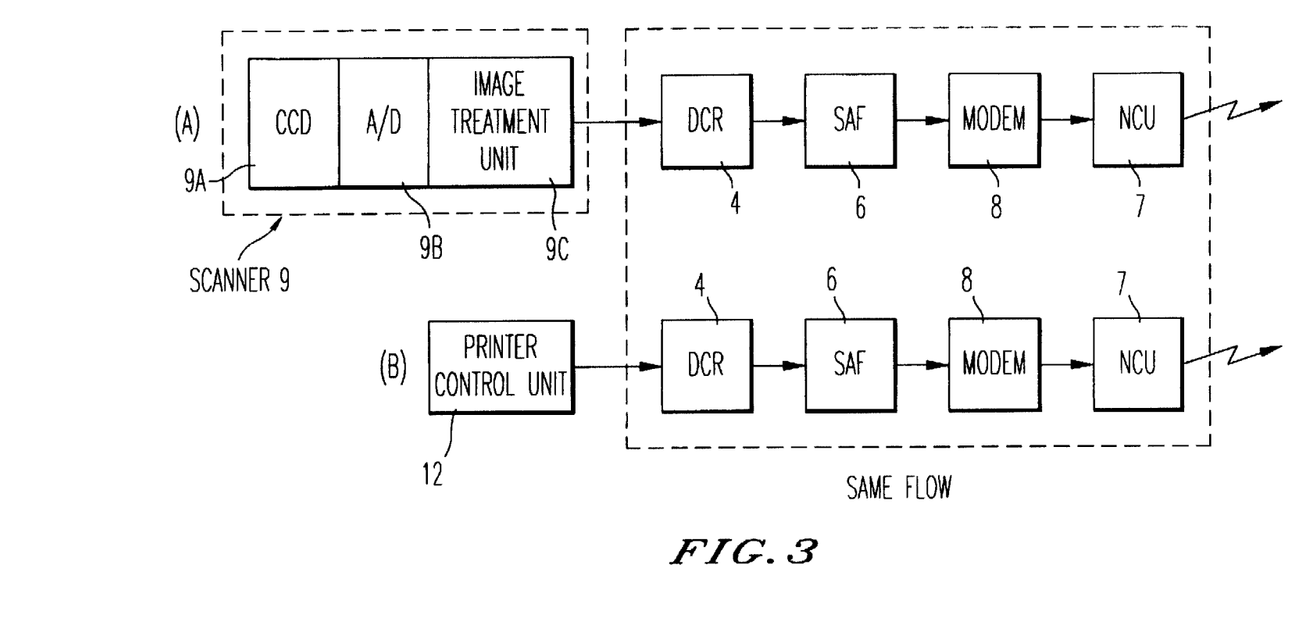
FIGS. 3A and 3B are schematic block diagrams respectfully illustrating flow of image data from a scanner and from a personal computer in a first embodiment of the facsimile apparatus of the present invention.

Referring to FIG. 3, a first embodiment of a facsimile apparatus of the present invention is shown.

In case of transmission of image data from the scanner unit 9, the image data is first read by scanner unit 9, and then the image data is transmitted to the DCR unit 4 for coding the read image data. After that, the coded image data is transmitted to the SAF memory 6 for sending to the predetermined destination facsimile apparatus by the MODEM 8 and NCU 7.

In case of transmission of image data from the personal computer through the printer control unit 12, the image data from the personal computer is transmitted to the DCR unit 4 for coding the image data.

After that, the coded image data is transmitted to the SAF memory 6 for sending to the predetermined destination facsimile apparatus by the MODEM 8 and NCU 7 with the same image data flow as in case of storing image data from the scanner.

Consequently, in the first embodiment of the facsimile apparatus, the flow of image data from the scanner 9 and the printer control unit 12 is made to be same, so that it is unnecessary to design or manufacture a facsimile apparatus both with and without a printer function. Therefore, the cost of the facsimile apparatus is reduced due to reduced overhead, i.e., it is not necessary to alter processing of the facsimile apparatus as a result of whether or not a printer control unit is also provided.

Figure 4:
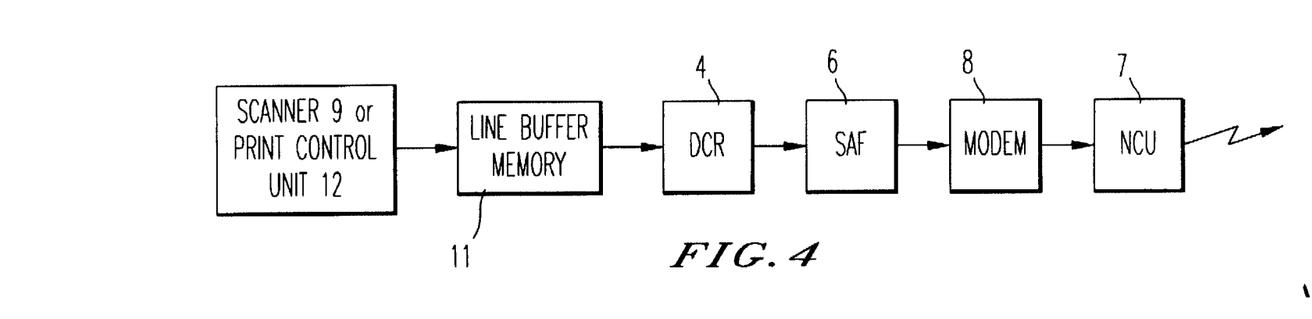
FIG. 4 is a schematic block diagram illustrating flow of image data from a scanner and a personal computer in a second embodiment of the facsimile apparatus of the present invention.

Referring now to FIG. 4, a second embodiment of a facsimile apparatus of the present invention is shown.

In the first embodiment, in case of storing an image data from the scanner unit 9, the scanner unit 9 may start to read the next image only after the image data is completely transmitted to the DCR unit 4 and the SAF memory 6, so that the reading time becomes long.

Therefore, in the second embodiment, the image data from the scanner 9 or the printer control unit 12 is transmitted to the line buffer memory 11 before the SAF memory 6, so that the scanner is able to start reading the next several lines without waiting for compression of image data by the DCR unit 4.

Figure 5A:
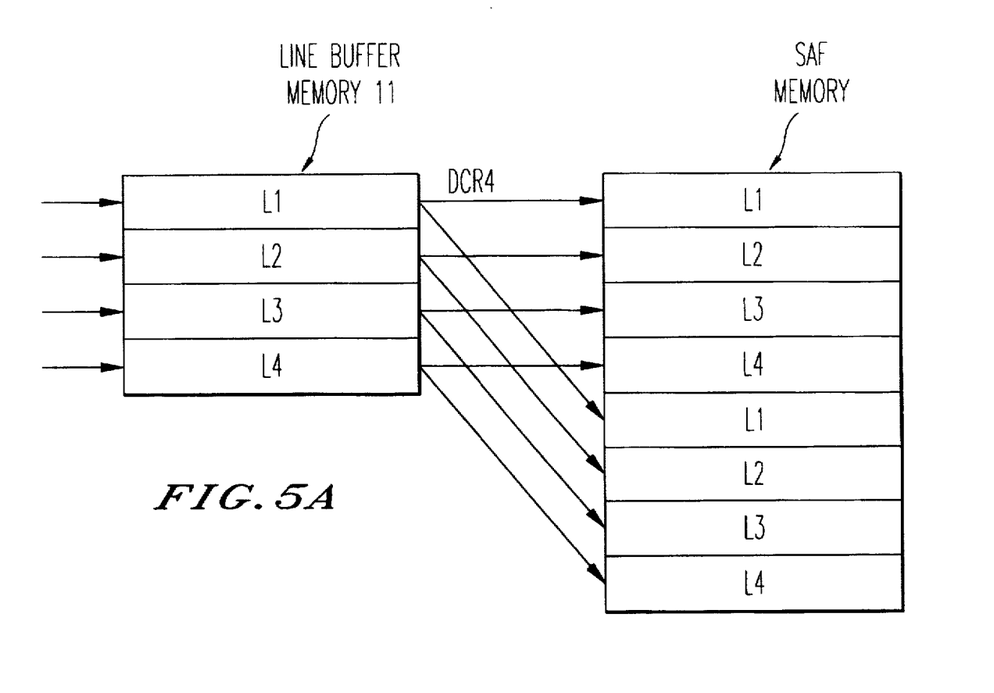

FIG. 5 (a) schematically explains this procedure.

Incidentally, the scanner unit 9 may read the image data 4 lines at one time, and the line buffer memory 11 therefore has capacity for storing the image data of 4 lines.

In the second embodiment, image data from the scanner 9 is first transmitted to the line buffer 11. Then the scanner 9 starts to read the next image, and the line buffer memory 11 starts to transmit the image data to the DCR unit 4 for compressing the image data.

Referring to FIG. 6, the third embodiment of an facsimile apparatus is shown.

In the second embodiment of the facsimile apparatus, the image data from the scanner 9 or the printer control unit 12 is transmitted to the line buffer memory 11. So that, in case of storing the image data from the printer controller 12, there is a potential problem in which the stored image data in the line buffer memory 11 is destroyed because outputting of the stored image data does not catch up with inputting new image data into the line buffer memory 11.

The reason for this is that the personal computer requests to output after preparing the image data and the image data from the personal computer is transmitted without breakoff.

Figure 5B:
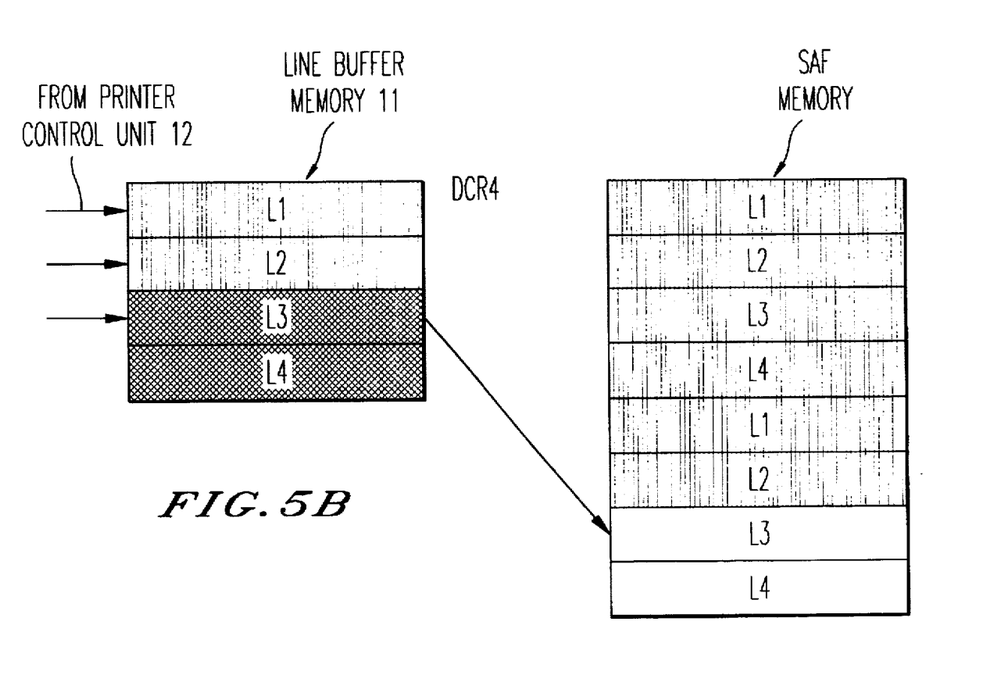
Figure 6A:
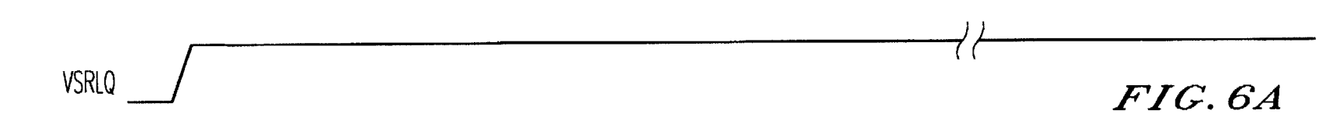
FIG. 6 is a timing chart showing signals between the CPU 1 of FIG.1 and a printer control unit in second and third embodiments of the facsimile apparatus of the present invention.
Figure 6B:
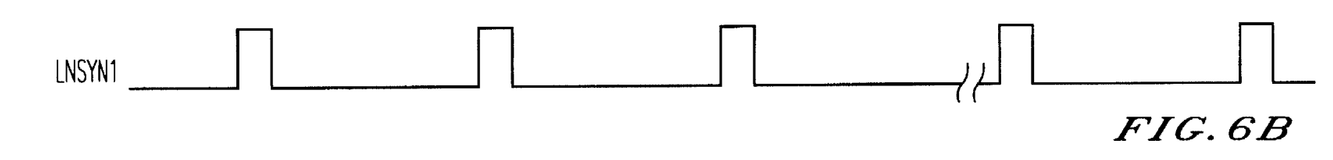
Figure 6C:
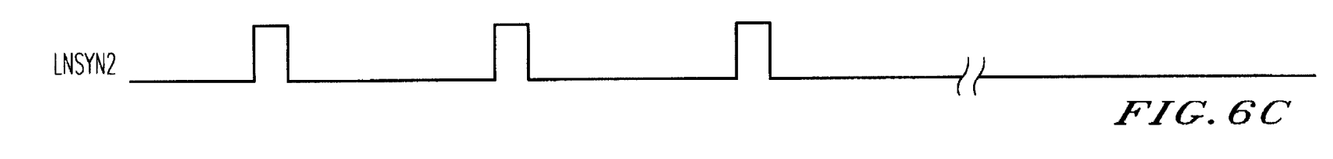
Figure 6D:
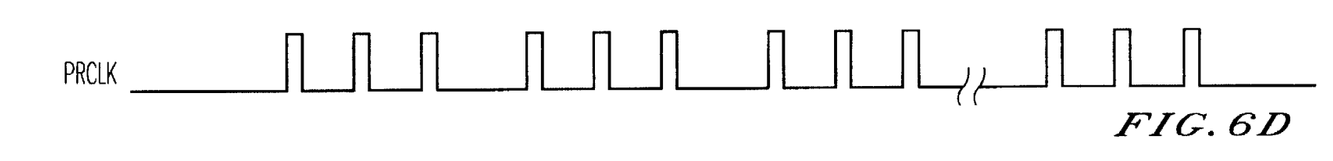
Figure 6E:
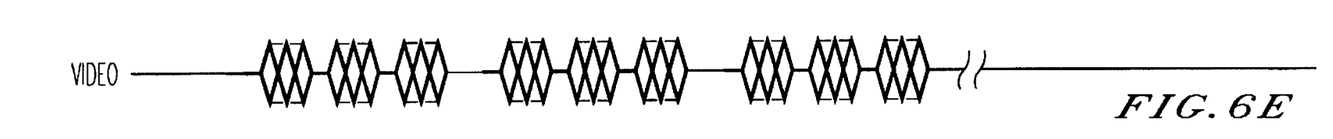
Figure 6F:
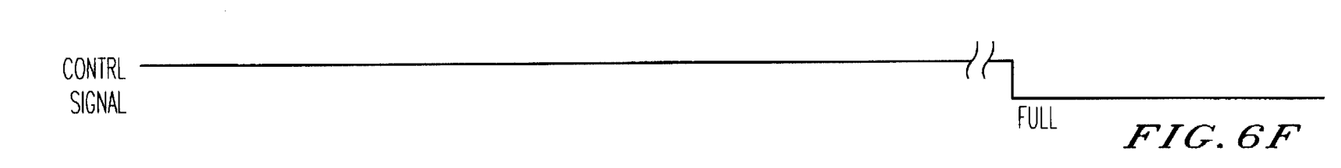

For example, when the image data in a L3 area of the line buffer memory 11 has not yet been transmitted to the DCR unit 4 as shown in FIG.5(b), namely due to a condition that the line buffer memory 11 is full, if the next image data is transmitted to the L3 area, the prior image data is cleared due to storing the next image data in the L3 area.

Therefore, the third embodiment of the facsimile apparatus includes a mechanism for stopping or allowing output of image data from the printer control unit 12 based on the condition of the line buffer memory 11.

FIG.6 shows signals transmitted between the CPU 1 and printer control unit 12.

The VSREQ (vertical signal request) signal is transmitted from the CPU 1 to the printer control unit 12, and indicates that output image data from the printer control unit 12 is allowed. By the way, the CPU 1 outputs the VSREQ signal to be active until the image data of one page is completely transmitted from the printer control unit 12.

Figure 8:
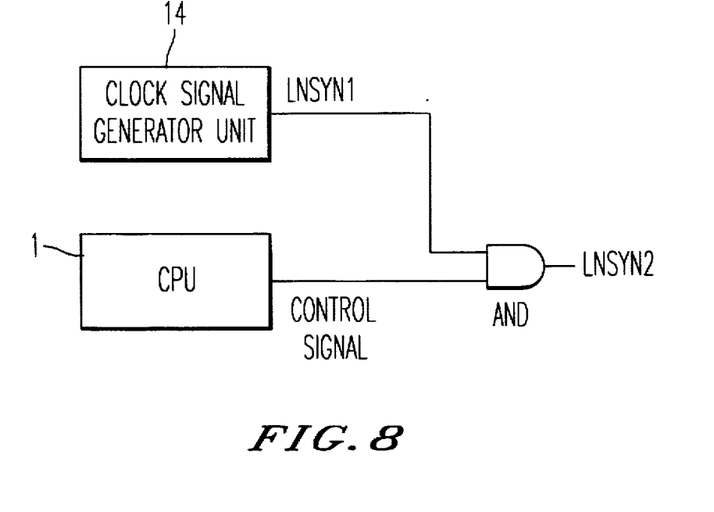
FIG. 8 is a schematic circuit diagram of the third embodiment of the facsimile apparatus of the present invention.

The LYSIN (line synchronization) signal 1 is generated by a clock signal generation unit 14 (see FIG. 8). The LYSIN signal 2 is generated by the circuit of FIG.8, and indicates that one line of image data is allowed to be output from the printer control unit 12. In this way, the printer control unit 12 stops transmitting image data when LYSIN 2 is nonactive.

The PRCLK (print clock) signal is transmitted from the CPU 1 to the printer control unit 12 when LYSIN 1 is active, and for each PRCLK signal, a pixel of image data is transmitted. The VIDEO signal is shown in FIG.8 to represent a pixel of the image data from the printer control unit 12.

Figure 7:
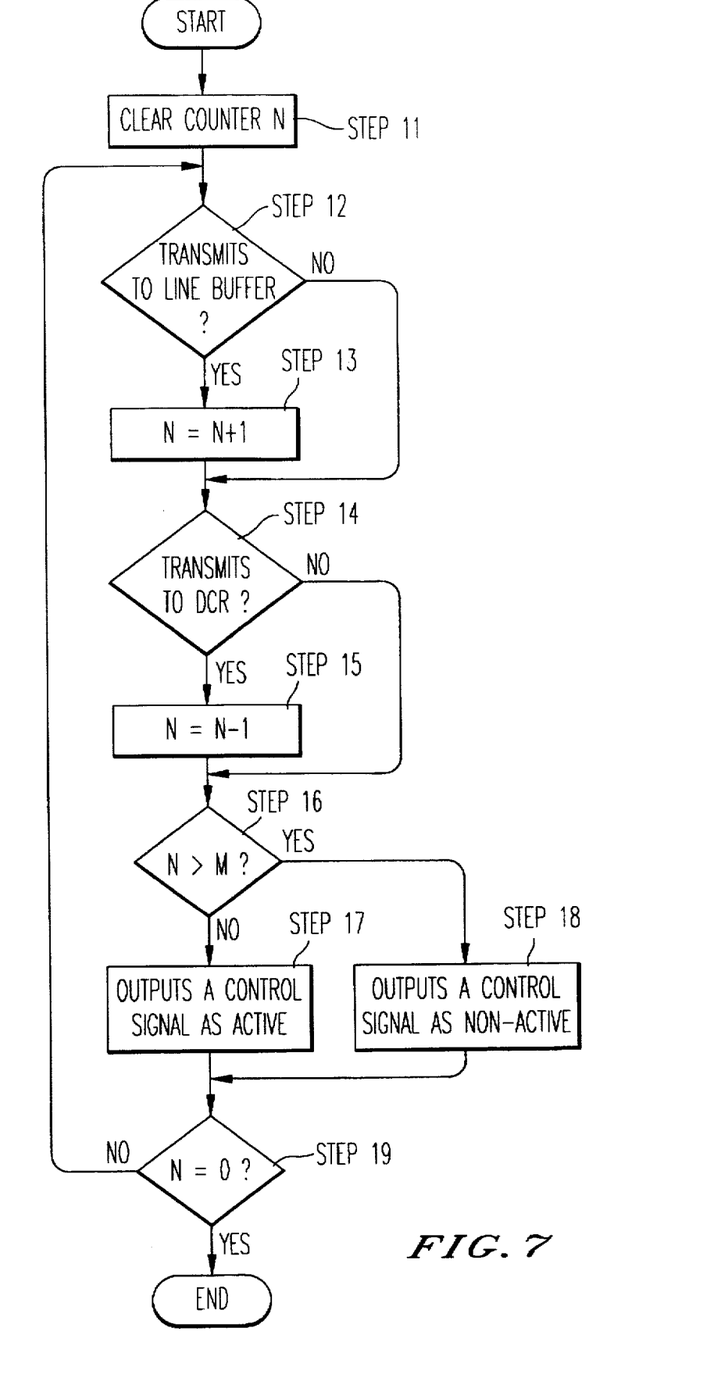
FIG. 7 is a flow chart illustrating steps performed in checking the condition of the line buffer memory in the third embodiment of the facsimile apparatus of the present invention.

FIG. 7 is a flow chart showing steps for checking the condition of the line buffer memory 11. In the remote print mode, when a request to output image data has occurred, the CPU 1 clears a counter N of the RAM 3 in step 11. Then, if the image data for one line is transmitted completely in step 12, the CPU 1 increments the count of counter N by one in step 13. Then, the CPU 1 checks whether or not the stored image data is transmitted to the DCR unit 4 in step 14, and the CPU 1 decrements the count of counter N by one in step 15.

Next, the CPU 1 checks whether or not the count of the counter N exceeds a predetermined number M which is set based on the capacity of the line buffer memory 11 in step 16. (For a 4 line buffer memory, M=4) When the count of the counter N does not exceed M, the CPU 1 continues to output a control signal as active from the output port in step 17.

On the other hand, the CPU 1 stops outputting the control signal 1 in step 18 when the count of the counter N exceeds M.

In step 19, the CPU 1 checks whether or not the count of the counter N is "0", thereby determining whether or not transmitting of the image data is finished.

Therefore, when operating in a mode in which image data is output from the printer control unit 2 for remote transmission, the CPU 1 controls output of the control signal applied to the AND circuit of FIG. 8 based on condition of the line buffer memory 11. On the other hand when operating in the local print mode, in which image data from the control unit 12 is applied directly to a local printer, the CPU 1 always outputs the control signal to the printer control unit 12.

FIG. 8 shows a circuit for generating the LYSIN signal 2, which is a feature of the third embodiment of the facsimile apparatus.

The AND circuit has input thereto the LYSIN signal 1 from the clock signal generation unit 14 and the control signal from the output port of the CPU 1, and outputs the overlap signal (LYSIN signal 2) of these inputted signals. For example, when the condition of the VSREQ signal is active, the condition of the LYSIN signal 1 and 2 becomes active, with slight delay, as shown in FIG.6.

After that, the PRCLK signal is generated and the printer control unit transmits one pixel of the image data in synchronization with each successive PRCLK signal.

In this circumstance, if the condition of the line buffer memory 11 is full and the CPU 1 stops outputting the control signal, the LYSIN signal 2 becomes nonactive and the printer control unit 12 stops transmitting the image data.

Therefore, when the condition of the line buffer memory 11 is full, the state of the LYSIN signal 2, which determines whether or not outputting of the image data is allowed, becomes nonactive, so that destruction of the stored image data which has not yet been transmitted is prevented.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A facsimile apparatus having an image scanning function for producing an image of an original document and a printer function for printing out image data from a computer, comprising:

a scanner device which reads the original document and produces corresponding image data;

a printer control device which controls a connection with said computer to receive image data from the computer;

a communication device capable of sending the image data in the form of facsimile data to a destination facsimile apparatus;

an image processing memory which stores the image data from said scanner device and said printer control device, and outputs the stored image data to the communication device for transmission as said facsimile data;

a buffer memory which stores image data from said scanner device and from said printer control device, and transmits the stored image data to said image processing memory; and a signal generation device which generates a signal indicating whether or not transmitting image data from said printer control unit is allowed, including, a control device which outputs a control signal to the printer control unit based on a condition of said buffer memory, including, a control mechanism which determines whether or not said buffer memory is full, and wherein said control device outputs said control signal to the printer control unit to delay outputting of image data if said control mechanism determines that said buffer memory is full.

2. A facsimile apparatus in accordance with claim 1, comprising:

a mode setting device which sets a local print mode for printing out image data from a computer or which sets a remote print mode for sending image data in the form of facsimile data.

* * * * *